United States Patent [19]

Cornelison et al.

[11] Patent Number: 4,792,422
[45] Date of Patent: Dec. 20, 1988

[54] METHOD OF MAKING AN OPTICAL FIBER CABLE

[75] Inventors: Kenneth E. Cornelison, Overland Park; Michael E. McGuire, Shawnee Mission, both of Kans.

[73] Assignee: Ericsson, Inc., Overland Park, Kans.

[21] Appl. No.: 12,753

[22] Filed: Feb. 9, 1987

Related U.S. Application Data

[62] Division of Ser. No. 687,601, Dec. 31, 1984.

[51] Int. Cl.⁴ .......................... B05D 7/20; B32B 1/06
[52] U.S. Cl. ...................................... 264/1.5; 264/174
[58] Field of Search ................................. 264/1.5, 174

[56] References Cited

U.S. PATENT DOCUMENTS

| | | |
|---|---|---|
| 3,887,265 | 6/1975 | Margolis et al. . |
| 3,955,878 | 5/1976 | Nowak . |
| 4,097,119 | 6/1978 | Kumamaru et al. . |
| 4,153,332 | 5/1979 | Longoni . |
| 4,172,106 | 10/1979 | Lewis ................... 264/174 |
| 4,221,756 | 9/1980 | Piper et al. ........... 264/174 |
| 4,230,395 | 10/1980 | Dean et al. ........ 350/96.23 |
| 4,372,792 | 2/1983 | Dey et al. ............. 264/1.5 |
| 4,409,154 | 10/1983 | Grenat .................. 264/1.5 |
| 4,640,576 | 2/1987 | Eastwood et al. ...... 350/96.23 |

FOREIGN PATENT DOCUMENTS 2036599  7/1980  United Kingdom ........... 264/174

*Primary Examiner*—James Lowe
*Attorney, Agent, or Firm*—Burns, Doane, Swecker & Mathis

[57] ABSTRACT

Single mode optical fiber cable with a plurality of buffer tubes wherein the buffer tubes each encase a plurality of single mode optical fibers, the fibers run in a random pattern through the buffer tube and the remaining space is filled with soft filler material which prevents the ingress of moisture while allowing free movement of the fibers within the tubes, the fibers all have equal overlength.

9 Claims, 4 Drawing Sheets

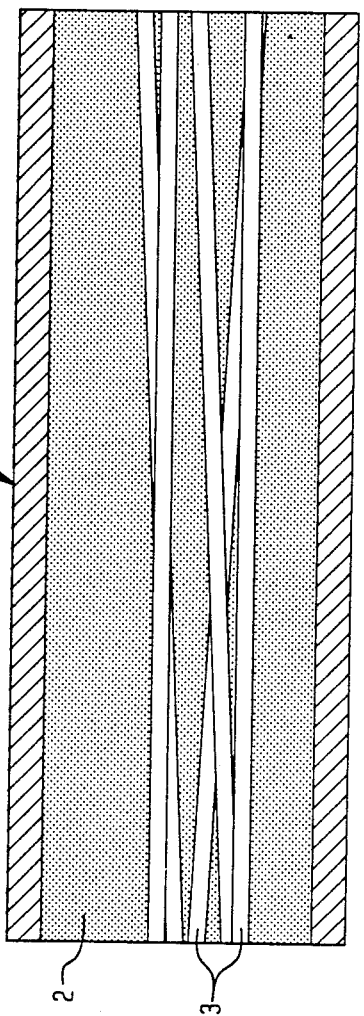
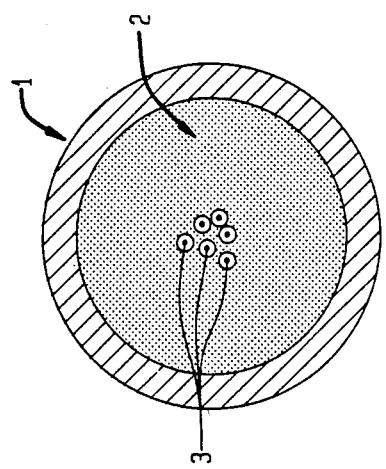

METHOD OF MAKING AN OPTICAL FIBER CABLE

This is a division of application Ser. No. 687,601, filed Dec. 31, 1984.

BACKGROUND OF THE INVENTION

1. Field of The Invention

The invention relates to optical fiber transmission cables and in particular to a new optical fiber cable and method and apparatus for making it.

2. Background Information

Optical fiber cables for transmission signals are known in the art. An optical fiber cable may be made up of a plurality of optical fibers housed within a sheath. An optical fiber is an elongated element of narrow diameter and great or indefinite length. The optical fiber is formed of glass or synthetic material and comprises a core of predetermined refractive index and a covering of smaller refractive index.

Use of optical fibers entails some difficulties, in that, large numbers of fibers must be contained in a single cable. The fibers must be placed in the cable such that each fiber is free from excessive mechanical stress which causes microbending in the fiber and a resultant increase in attenuation.

A preferred fiber optic cable utilizes fibers which propagate only one mode of light compared with multimode fibers which propagate several modes along the fiber core. Present single mode fibers are more sensitive to microbending losses, particularly at the longer wavelengths used in today's systems than multimode fibers previously used for telecommunications. The single mode fibers have inherent attenuation that is only a fraction of that in multimode fibers available a few years ago. Typically, telecommunication grade single mode fibers have an attenuation of 0.3 to 0.5 db/km at 1300 nm wavelengths as compared to multimode fibers which have attenuations of 3 to 4 db/km. Microbending can cause increased losses at this wavelength in the order of 0.1 to 0.3 db/km. Therefore any additional attenuation due to microbending is much more significant with single mode fibers. Additionally, new transmission systems operate at 1550 nm on single mode fibers. Microbending at this wavelength can be in the order of 0.1 to 3.0 db/km which esseniially could make the cable unusable for transmission at this wavelength. Therefore, reduced levels of stress and microbend induced attenuation are necessary for single mode cable designs.

In order to limit the attenuation various types of cables have been developed. U.S. Pat. No. 4,153,332 discloses an optical fiber cable wherein a group of tightly bundled optical fibers are housed within a tube and a plurality of those tube are wound or stranded to produce a cable when covered by an outer sheath. This cable, however, is susceptible to water damage caused by water entering through a leak in the sheath and running along the interior space of the cable sheath and the tubes. Moreover, the fibers in the '332 cable are of unequal overall length. This is because the effective diameter of the cable coils differs depending on fiber location. That is, when the fibers are in a bundle, the fibers innermost in the coil travel a loop of smaller radius than do the fibers outermost in the coil.

U.S. Pat. No. 4,331,379 to Oestreich et al. provides for filling the space within the cable between a stranded fiber bundle and the inner cable wall with a soft filler. The filler improves the prevention of moisture ingress in the cable. However, the stranded inner bundle of optical fibers increases the bending stresses in the fibers and therefore increases the attenuation.

In manufacture, the stranded bundle is easier to handle, however, more machinery, and therefore increased cost is necessary to strand the fibers. If parallel fibers are used, they are often difficult to handle and the fibers may end up with widely divergent lengths and therefore inconsistent transmission quality.

SUMMARY OF THE INVENTION

The invention relates to an optical fiber buffering tube which employs two or more coated single mode optical fibers placed in a single oversize buffer tube. The fibers are laid substantially parallel with the tube axis and each other. The tube is simultaneously filled with a soft thixotropic gel or thickened oil. The gel or oil prevents the ingress of moisture into the tube while allowing the fibers to move freely and independently of each other. The tube is made of hard plastic material which provides structural strength and protection to the fibers.

The generally parallel arrangement of the fibers results in lower bending stresses than if the fibers were stranded into a bundle within the tube. The filling material provides a freedom of movement of the fibers within the tube so that the fibers remain relatively free of any net compression or tensile stress during elongation, contraction or bending of the tube. By providing that the fibers are of substantially equal length, the fibers are caused to react similarly to a bend in the tube. That is, they take a position which causes the least stress and therefore the least attenuation.

The apparatus and method of the invention provide for the manufacture of the fiber tube with generally parallel fiber of equal length disposed within it. The insertion of the fibers is accomplished by means of a series of payoff bobbins and a controlling capstan. The controlling capstan regulates the overlength of the fibers within the tube such that each fiber has the same overlength. The rotational speed of the capstan is dependent upon the linear speed of the tube and controlled by control unit.

A feature of the apparatus is its provision for a guide mechanism to prevent overlapping the fibers. This feature and the precise tolerances of the capstan provide for uniform overlength of the fibers by preventing overlapping of the fibers on the capstan which causes differences in overlength for the inner and outer fibers.

The fiber payoffs or bobbins are designed to provide uniform tension in the various fibers. Unequal tension would create non-uniform elongation and therefore unequal fiber overlength in the buffer tube.

The optical fibers are grouped in a random pattern by funnel-like means and fed into an extrusion aparatus.

The buffer tube is extruded around the optical fibers, with sufficient space to allow the fibers to move freely, by the extrusion apparatus. The apparatus also fills the buffer tube with a protective filler.

Several buffer tubes may be stranded together with a back twist around a central support member which provides compression and tensile strength. The stranding of the buffer tubes provides essentially equal path lengths for each of the fibers, regardless of its relative position within the tube. The helix formed by the stranded tube provides an elongation quality to the cable without stressing the fibers.

BRIEF DESCRIPTION OF THE DRAWINGS

The invention will be described with reference to the drawings wherein:

FIG. 1 is a transverse cross-sectional view of the buffer tube assembly of the invention;

FIG. 2 is a longitudinal cross-section of the buffer tube assembly;

DESCRIPTION OF THE PREFERRED EMBODIMENT

The description is given with reference to the drawings. The same or similar numbers are used to denote the same or similar items throughout the figures.

The buffer tube depicted in FIGS. 1 and 2 is comprised of an outer covering 1 which is filled with soft filling material 2, such as thixotropic filling compound. Disposed within the tube are at least two coated single mode optical fibers which are loosely spaced with respect to each other. The loose spacing of the fibers assures that the fibers move freely and maintain their uniform length. The internal cross-sectional area of the buffer tube 1 is larger than the cross-sectional area of the fibers; this allows the fibers room to move within the buffer tube 1.

The fibers are placed in the buffer tube with an overlength. That is, each fiber has a length which is incrementally greater than the tube which encases it. This requires the fiber to follow a wavey path within the tube as long as the tubes are straight. Once the tubes are stranded into a cable, the overlength causes the fibers to follow the general shape of the buffer tube 1.

Figure 3:
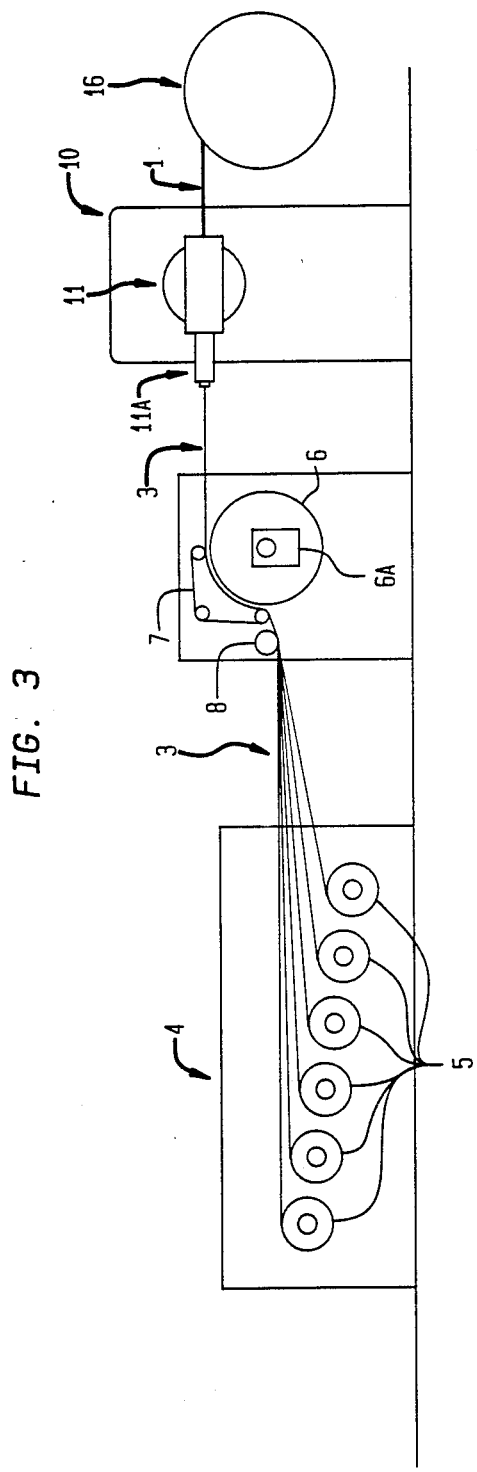
FIG. 3 is a side elevational view of the apparatus of the invention.

FIG. 3 depicts the apparatus for manufacturing the buffer tube. The payoff stand 4 holds a plurality of payoff reels 5 which provide equal and consistent tension to the optical fibers. Consistent tension is necessary to provide the fibers with equal elongation so that the uniform overall length may be maintained. The fibers 3 pass between a capstan 6 and a mechanism for biasing the fibers against the capstan 6. In this embodiment the mechanism is a belt 7. This biasing mechanism causes friction between the fibers 3 and the capstan 6. This assures that all the fibers 3 and the capstan 6 are traveling at uniform speed.

Figure 4A:
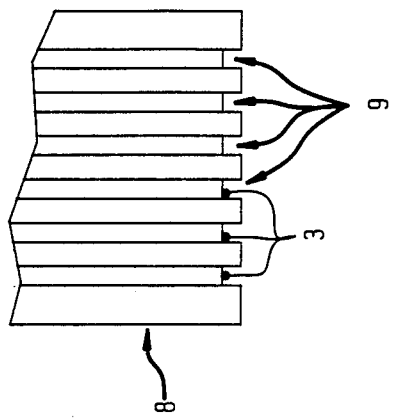
FIG. 4A is an enlarged view of a portion of the guidewheel.
Figure 4:
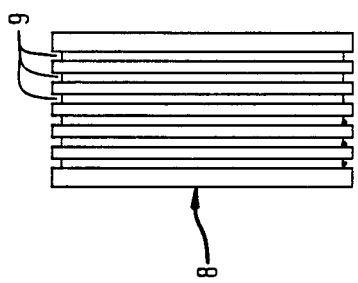
FIG. 4 is a front view of the guidewheel of the apparatus of the invention.

An important feature of the device is the guidewheel 8. The guidewheel 8 keeps the fibers sufficiently separated so that overlapping of the fibers 3 does not occur along their path length. The configuration of this wheel is best shown in FIGS. 4 and 4A. The guiding devices comprises a series of grooves 9 which receive the fibers 3 and separate them in a horizontal plane. This separation prevents the fibers from bunching on the capstan 6 by putting them in a parallel but separated relationship.

An extruder 10 (FIG. 3), which has basic construction which is known to these skilled in the art, is used to process resin to form the buffer tube 1. A crosshead 11 allows both injection of the filling material 2 and the disposition of the optical fibers 3 within the extruded buffer tube 1. The fibers are gathered into a random pattern by funnel-like means 11A and carried through the extruder. During this operation, the fibers are carried by the viscous filling material. The speed of the capstan 6 is dependent upon the speed of the buffer tube 1 issuing from the crosshead 11 and is controlled by control means 6A. This assures uniformity of overlength of each fiber along the length of the buffer tube assembly.

Figure 5:
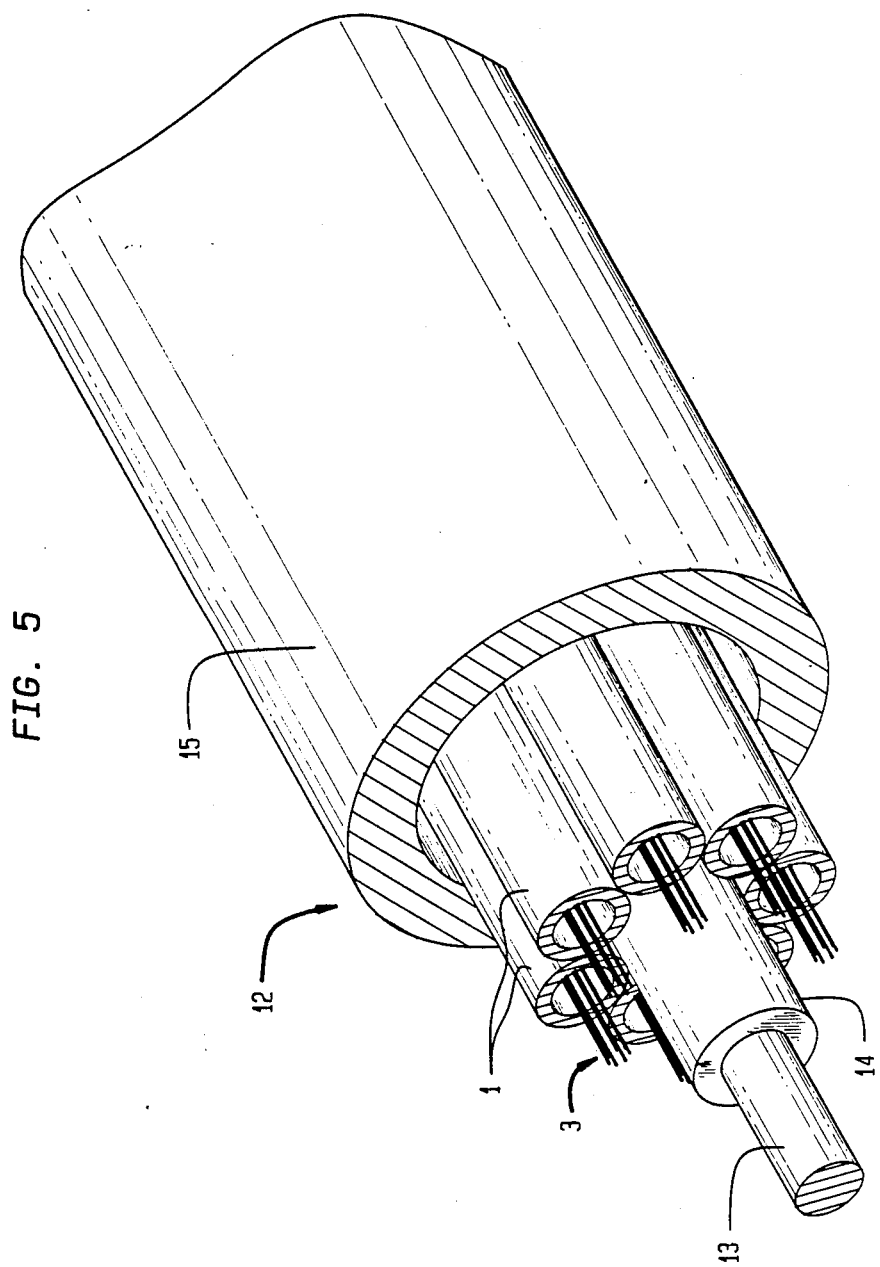
FIG. 5 is a view of the completed cable assembly.

The buffer tube 1 may then be gathered onto a spool 16 or stranded into a cable 12 shown in FIG. 5. A strength member 13 provides axial compression and axial tensile strength. The coating 14 provides protection by buffering the contact between strength member 13 and the plurality of buffer tubes 1. The coating 14 also provides sufficient circumferential space for the proper placement of the buffer tubes 1, depending on the number of buffer tubes 1 stranded about the strength member 13. The tubes 1 which contain the fibers 3 are stranded with a finite pitch which results in additional elongation and contraction capability for the assembly. These additional capabilities are provided without inducing additional stress in the fibers 3. The stranding also provides equal path lengths of the tubes regardless of their position within the assembled cable 12 which reduces fiber bending stress. The interstices between the tubes 1 may or may not be filled with a material to prevent the ingress of moisture. A sheath 15 is applied to the cable assembly 12 to provide extra protection.

We claim:

1. The method of making optical fiber cables with fibers of equal length comprising:
    (a) pulling a plurality of single mode optical fibers under equal stress such that any elongation thereof is equal for each fiber;
    (b) loosely encasing equal overlengths of fibers in random relation to each other in an extruded buffer tube; and
    (c) filling the buffer tube with soft filler material.

2. The method according to claim 1 wherein the fibers are fed toward the extruded buffer tube in parallel spaced relation in a single plane.

3. The method according to claim 1 wherein the fibers are pulled in a parallel, non-overlapping relation, in a single plane over a capstan along their path to said buffer tube.

4. The method according to claim 1 wherein said optical fibers are pulled by frictional contact with a capstan and said fibers lie in spaced, parallel and planar relation when in contact with said capstan and fed toward said extruded tube.

5. The method according to claim 1 wherein said optical fibers are gathered into a random pattern as they are encased in said buffer tube.

6. The method according to claim 1 wherein the optical fibers are surrounded by said soft filler material and then the buffer tube is formed around said fibers and said filling material.

7. A method for assembling optical fibers in a buffer tube that is used to make an optical fiber cable, comprising the steps of:
    passing plural optical fibers in a spaced, parallel fashion into frictional engagement with a capstan with equal tension in each fiber to thereby maintain uniform overall lengths of fibers;
    gathering the fibers into a random pattern after they have passed over the capstan;
    extruding a buffer tube around the gathered fibers; and injecting a filling material into the buffer tube as it is being extruded.

8. The method of claim 7 wherein all of said fibers are co-planar as they engage the capstan.

9. The method of claim 8 wherein said fibers are separated into a spaced, parallel, co-planar relationship by means of a grooved guide wheel prior to their engagement with the capstan.

* * * * *